(12) United States Patent
Stammers et al.

(10) Patent No.: US 11,310,114 B2
(45) Date of Patent: Apr. 19, 2022

(54) INDUSTRIAL MACHINE CONFIGURATION USING PRIVATE WIRELESS NETWORKING

(71) Applicant: Cisco Technology, Inc., San Jose, CA (US)

(72) Inventors: Timothy Peter Stammers, Raleigh, NC (US); Stephan Edward Friedl, Frederick, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 130 days.

(21) Appl. No.: 16/540,381

(22) Filed: Aug. 14, 2019

(65) Prior Publication Data

US 2021/0051069 A1 Feb. 18, 2021

(51) Int. Cl.
*H04L 12/24* (2006.01)
*H04L 29/08* (2006.01)
(Continued)

(52) U.S. Cl.
CPC ...... *H04L 41/0893* (2013.01); *H04L 41/0806* (2013.01); *H04L 67/28* (2013.01); *H04W 76/10* (2018.02)

(58) Field of Classification Search
CPC ............ H04L 41/0893; H04L 41/0806; H04L 67/28; H04L 63/0281; H04L 43/00;
(Continued)

(56) References Cited

U.S. PATENT DOCUMENTS

2013/0188515 A1 7/2013 Pinheiro et al.
2014/0321367 A1* 10/2014 Marupaduga ......... H04W 88/04
370/329

(Continued)

FOREIGN PATENT DOCUMENTS

CN 1392979 A 1/2003
CN 100380324 C 4/2008
(Continued)

OTHER PUBLICATIONS

Maliatsos, A. Gotsis et al., "Experimenting with Flexible D2D Communications in Current and Future LTE networks: A D2D Radio Technology Primer & Software Modem Implementation", 2017 Wireless Innovation Forum European Conference on Communication Technologies and Software Defined Radio, downloaded Aug. 14, 2019, 24 pages.
(Continued)

*Primary Examiner* — Chi H Pham
*Assistant Examiner* — Ji-Hae Yea
(74) *Attorney, Agent, or Firm* — Edell, Shapiro & Finnan, LLC

(57) ABSTRACT

Techniques are described to provide industrial machine configurations using private wireless networking. In one example, a method includes provisioning a segmentation policy for a network area, wherein the segmentation policy identifies policy groups for the network area in which each policy group comprises a plurality of devices capable of inter-device communications; provisioning, at a proximity services controller, a connectivity policy for each policy group, wherein the connectivity policy for each of policy group identifies at least one proxy configuration for one or more types of information to be communicated among the plurality of devices of each policy group; establishing connectivity between each device of each of the policy groups and an access point; and communicating the one or more types of information to each of the policy groups based on the at least one proxy configuration for each policy group.

20 Claims, 7 Drawing Sheets

(51) Int. Cl.
*H04W 76/10* (2018.01)
*H04L 41/0893* (2022.01)
*H04L 67/56* (2022.01)
*H04L 41/0806* (2022.01)

(58) Field of Classification Search
CPC ......... H04L 41/00; H04L 67/12; H04L 67/18; H04L 67/2809; H04L 67/2833; H04L 41/0663; H04L 41/0816; H04L 41/16; H04L 41/0896; H04L 41/12; H04W 76/10; H04W 76/14; H04W 88/04; H04W 24/02; H04W 76/12; H04W 92/04; H04W 28/0268; H04W 88/085; G06F 9/45558; G06F 2009/45595
See application file for complete search history.

(56) References Cited

U.S. PATENT DOCUMENTS

| | | | | |
|---|---|---|---|---|
| 2015/0312766 A1* | 10/2015 | Teeni | ............... | H04W 24/02 455/411 |
| 2016/0021482 A1 | 1/2016 | Kumar et al. | | |
| 2016/0149928 A1* | 5/2016 | Zhang | ............... | H04L 67/16 726/7 |
| 2017/0295567 A1 | 10/2017 | Chen et al. | | |
| 2018/0084425 A1* | 3/2018 | Aminaka | ............... | H04W 76/14 |

FOREIGN PATENT DOCUMENTS

| | | | |
|---|---|---|---|
| EP | 2355570 B1 | 5/2015 | |
| WO | WO-2017105534 A1 * | 6/2017 | ........ H04W 72/0406 |
| WO | 2018004637 A1 | 1/2018 | |
| WO | 2018200570 A1 | 11/2018 | |

OTHER PUBLICATIONS

Ribeiro, Cassio, "Device-to-Device Communications in 3GPP LTE", Mar. 9, 2015, Nokia 2015, 24 pages.

3GPP, "3rd Generation Partnership Project; Technical Specification Group Services and System Aspects; Proximity-based services (ProSe); Stage 2 (Release 15)", 3GPP TS 23.303 V15.1.0, Jun. 2018, 130 pages.

3GPP, "3rd Generation Partnership Project; Technical Specification Group Services and System Aspects; Policy and charging control architecture (Release 15)", 3GPP TS 23.203 V15.5.0, Jun. 2019, 262 pages.

Thubert, Pascal et al., "Converged Wireless Technology Architectures: Hybrid Networks Consisting of Lora and Wi-Sun Nodes", Technical Disclosure Commons, Jun. 18, 2018, 7 pages.

* cited by examiner

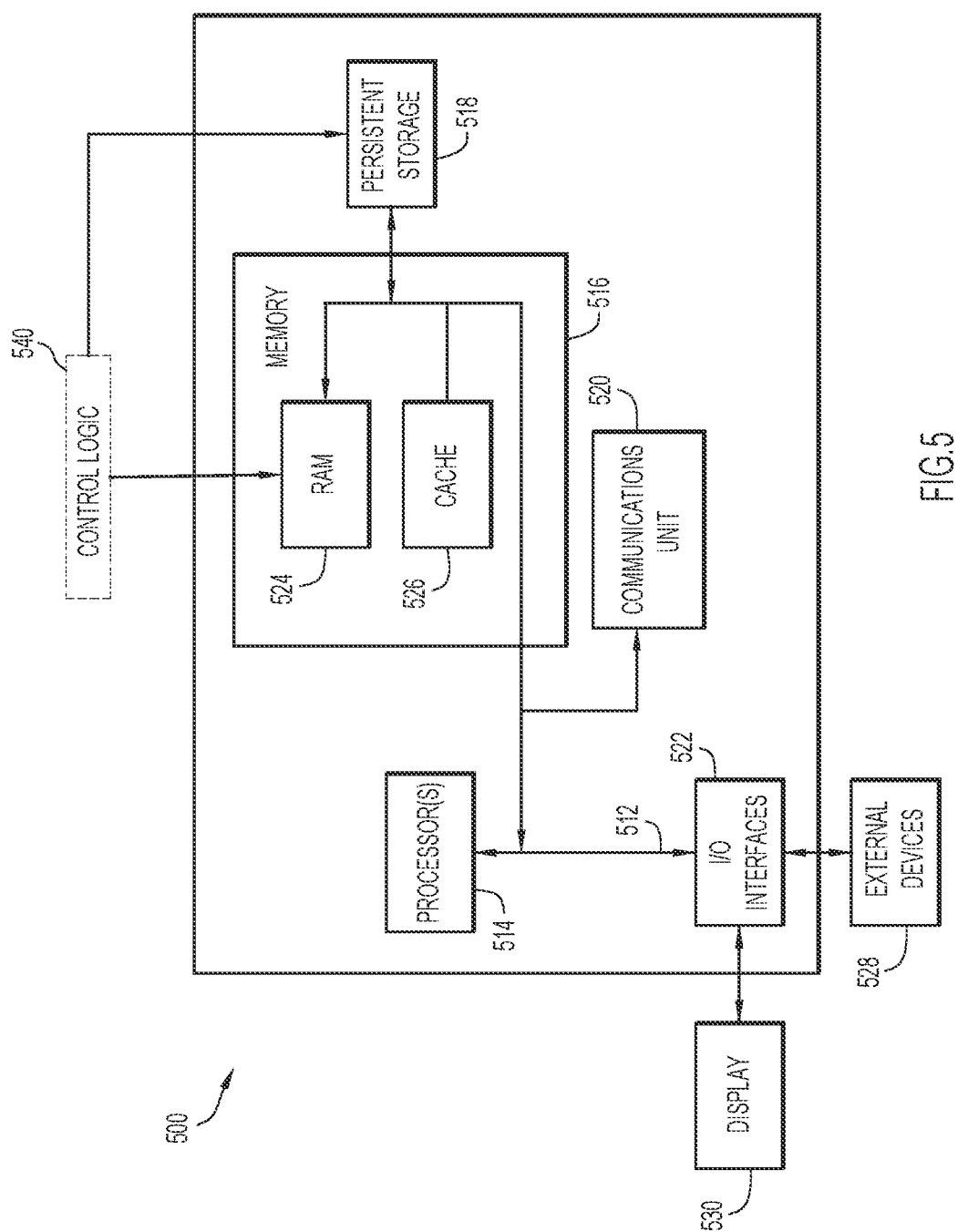

INDUSTRIAL MACHINE CONFIGURATION USING PRIVATE WIRELESS NETWORKING

TECHNICAL FIELD

The present disclosure relates to network equipment and services.

BACKGROUND

Deploying, connecting, and configuring industrial machines in a cabled infrastructure is complex. Industrial environments can often involve many different machines as well as different types of machines, which can be moved, replaced, taken offline, etc.; thereby further increasing the complexity involved in connecting, configuring, etc. such machines. Accordingly, there are significant challenges in deploying, connecting, and configuring industrial machines for industrial environments.

BRIEF DESCRIPTION OF THE DRAWINGS

FIG. 5 is a hardware block diagram of a computing device that may perform functions for providing industrial machine configuration using private wireless networking, in connection with the techniques depicted in FIGS. 1-4.

DESCRIPTION OF EXAMPLE EMBODIMENTS

Overview

Figure 1:
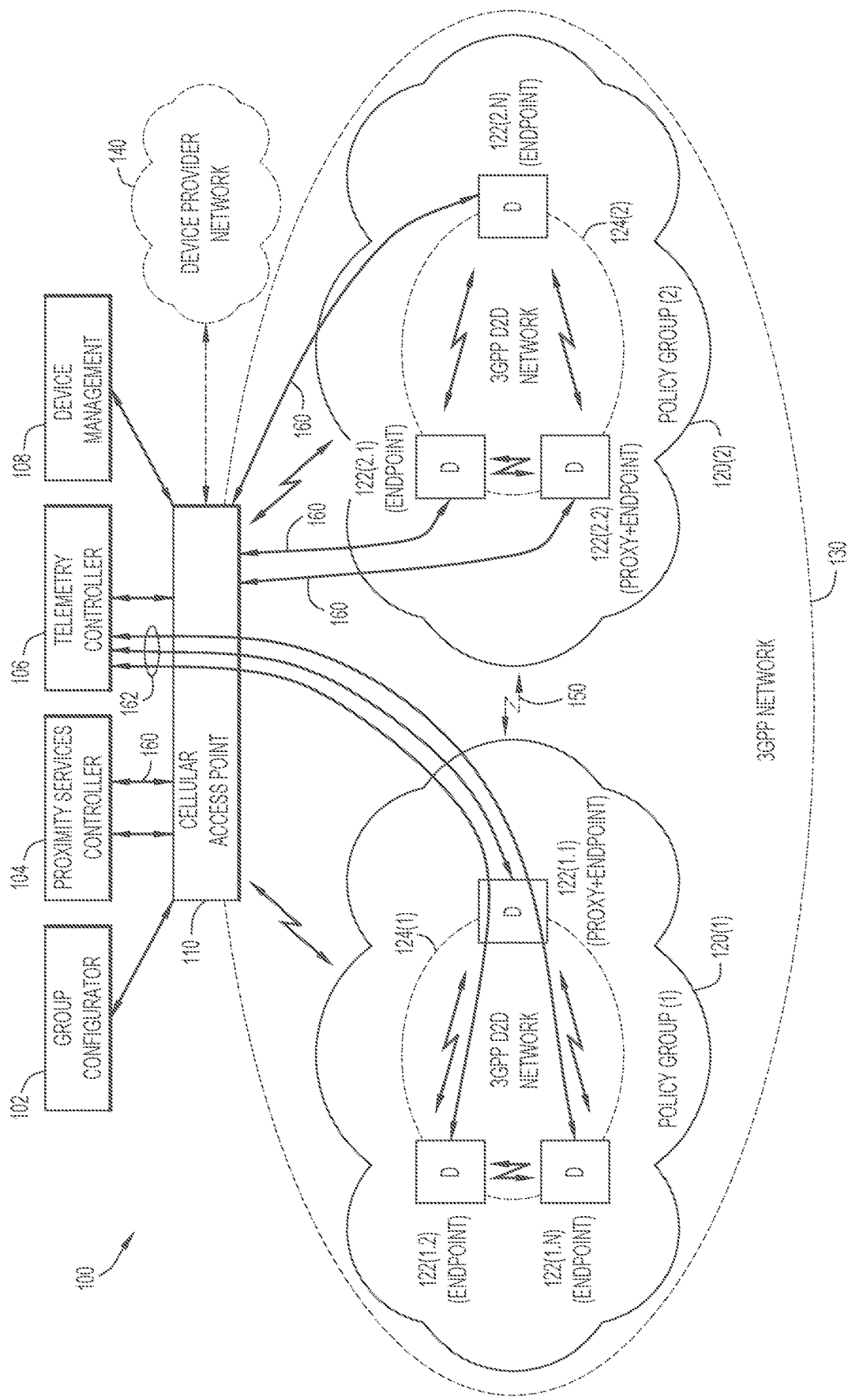
FIG. 1 is a block diagram of a system in which techniques for providing industrial machine configuration using private wireless networking may be implemented, according to an example embodiment.

Private wireless networks including Third Generation Partnership Project (3GPP) networks, such as 4th Generation (4G)/Long Term Evolution (LTE) and/or 5th Generation (5G) networks that can facilitate communications involving strict latency and/or quality of service (QoS) requirements create the ability to wirelessly connect manufacturing machines in an industrial setting or environment. Use of device-to-device (D2D) connectivity based on 3GPP approaches allows for the creation of trusted communication paths between a master/relay machine or more generally, a proxy machine and other machines of a machine network in which the communication paths may meet strict operational requirements for reliability, priority, and/or response times. Techniques presented herein provide for utilizing this technology to create a trusted point of entry (e.g., a proxy machine) to a network of machines for different purposes such as configuration, management, assurance monitoring, etc. across the machine network. This eliminates the need for network cabling and allows manufacturing line reconfiguration, which may be dependent only on power connectivity.

In an example embodiment, a method is provided that includes provisioning a segmentation policy for a network area, wherein the segmentation policy identifies a plurality of policy groups for the network area in which each policy group comprises a plurality of devices capable of inter-device communications. The method may further include provisioning, at a proximity services controller for the network area, a connectivity policy for each policy group of the plurality of policy groups, wherein the connectivity policy for each of policy group identifies at least one proxy configuration for one or more types of information to be communicated among the plurality of devices of each policy group; establishing connectivity between each device of each of the plurality of policy groups and at least one access point; and communicating the one or more types of information to each of the plurality of policy groups based on the at least one proxy configuration for each connectivity policy of each policy group.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Deploying, connecting, and configuring industrial machines in a cabled infrastructure is complex. Adoption of 'industrial-strength' wireless networking such as 4G/5G/xG networking provides the ability to reduce this complexity by providing the requisite low latency communications, telemetry, and management connectivity using a wireless infrastructure. In such a wireless environment, simplified operational technology (OT) Day-1 configurations of multiple machines can be achieved along with Day-N changes as production/manufacturing lines, machine usage, etc. is/are adapted, repurposed, repaired, etc.

Presented herein are techniques to address the initial deployment and ongoing configuration aspects of operations involving industrial or other environments in which many industrial devices (e.g., machines, robots, etc.) may be deployed. In at least one embodiment, a gateway or proxy device may be designated as the relay point for a 3GPP Device-2-Device (D2D) network of a given group of devices, referred to herein as a 'policy group'. For such an embodiment, the other devices of the 3GPP D2D network for the policy group will have an established D2D path to that proxy under control of a cellular (e.g., 5G) access point (AP) that may be designated for a given network area (sometimes referred to as a 'factory cell') of a facility. In various embodiments, the nominated proxy may be the point of entry to provide Day-1 and later configuration to the devices of the policy group that have joined the trusted D2D network. Thus, using techniques presented herein, a single point of connectivity (e.g., a proxy device) may be presented per policy group, which may or may not act as a relay for different types of information/data that are to be communicated to/from devices of a policy group.

FIG. 1 is a block diagram of a system 100 in which techniques for providing industrial machine configuration using private wireless networking may be implemented, according to an example embodiment. In at least one implementation, the system 100 may include a group configurator 102, a 3GPP proximity services controller 104, a telemetry controller 106, a device management entity 108, and a cellular access point (AP) 110.

Further illustrated for system 100 are various policy groups (collectively referred to as policy groups 120) of devices (collectively referred to as devices 122) configured to operate in various 3GPP D2D networks (collectively referred to as 3GPP D2D networks 124) including a first policy group 120(1) including a number of devices 122(1.1)-122(1.N) capable of performing inter-device communications for a first 3GPP D2D network 124(1) and a second policy group 120(2) including a number of devices 122(2.1)-122(2.M) capable of performing inter-device communications for a second 3GPP D2D network 124(2). Devices 122 may also be capable of inter-device communications between first and second 3GPP D2D networks 124(1)-124(2) (generally illustrated as dashed-line arrows 150), depending on various policies as discussed in further detail herein. Cellular AP 110 and policy groups 120 may form a trusted 3GPP network 130 for system 100.

In some embodiments, cellular AP 110 may provide for communications with a device provider network 140. In various embodiments, device provider network 140 may be associated with a manufacturer of devices 122, hardware and/or software provider of devices 122, combinations thereof or the like that may monitor, update, and/or provide any other services for devices 122.

Methods and procedures as prescribed by 3GPP standards may be used to establish the trusted 3GPP network 130, as discussed in further detail herein. Such standards-based methods/procedures for establishing a private industrial cellular (e.g., 5G) network may enable a trusted means of wireless connectivity for configuring, managing, gathering, and/or processing information/data communicated amongst industrial machines or devices 122. Thus, techniques presented herein may form a foundation for further innovation in the area of services that may involve low latency communications in combination with the prioritization that is possible using proximity service constructs and the ability to create segmented networks based on such technology.

Depending on the magnitude of configuration, management, and/or telemetry traffic, D2D techniques presented herein may also support telemetry reporting; thereby simplifying the per-machine data management and data sovereignty aspects by applying various connectivity and/or data processing rules at a master gateway (e.g., proxy device) for a D2D group rather than at each individual machine of the D2D group. Techniques presented herein may also be used for machine-to-machine (M2M) communications for industrial control applications, in some embodiments.

Group configurator 102 may operate to provision a segmentation policy for a network area (e.g., a facility) to identify a number of policy groups of devices for the network area and to provision D2D related policies for the policy groups, such as a connectivity policy for each policy group, communication bands, etc. to facilitate D2D network formations for the network area. The connectivity policy for each group may be provisioned by group configurator 102 for proximity services controller 104, which may operate to configure and establish 3GPP compliant D2D networks for each policy group (e.g., for which D2D communications are allowed, as discussed below) in accordance with 3GPP specifications (e.g., 3GPP Technical Specification (TS) 23.303). Device management entity 108 may operate to onboard devices 122 for the 3GPP network 130. Telemetry controller 106 may operate to communicate telemetry policies and/or telemetry information to/from devices 122. In some embodiments, telemetry controller 106 may provide telemetry information to/from device provider network 140 for one or more device(s) 122 of system 100. Cellular AP 110 may operate to facilitate 3GPP cellular communications (e.g., 3G, 4G/LTE, 5G, etc.) with devices 122 of system 100.

In various embodiments, cellular access point 110 may be implemented as a Node B (NodeB) for 3G communications, an evolved NodeB (eNodeB or eNB) for 4G/LTE communications, a New Radio (NR) radio unit for 5G/NR communications, combinations and/or variations thereof, and/or the like. In some embodiments, cellular access point 110 may be configured to provide Wi-Fi communications in addition to cellular communications for system 100.

In various embodiments, devices 122 may be associated with any electronic device, machine, robot, etc. wishing to initiate a flow in system 100 that may include a subscriber identification module (SIM) device, embedded SIM (e-SIM) device, Universal Integrated Circuit Card (UICC), or the like. The terms 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, an iPhone™, iPad™, a Google Droid™ phone, an IP phone, any other device and/or combination of devices, component, element, and/or object capable of initiating voice, audio, video, media, or data exchanges within system 100. Devices discussed herein may also be inclusive of a suitable interface to a human user such as a microphone, a display, a keyboard, or other terminal equipment. Devices discussed herein may also be any device that seeks to initiate a communication on behalf of another entity or element such as a program, a database, or any other component, device, element, or object capable of initiating an exchange within system 100. It is to be understood that any number of devices may be present in system 100.

During operation in at least one embodiment, a method for establishing 3GPP network 130 may include provisioning, via group configurator 102, a segmentation policy for a network area, such as for a facility (e.g., a factory) or one or more facilities, in which the segmentation policy identifies one or more policy groups for the network area (e.g., policy groups 120(1)-120(2)) such that each policy group includes a plurality of devices capable of inter-device communications. Generally, a segmentation policy may indicate how devices of a facility or facilities may grouped, segmented, etc. into policy groups in order for apply of various rules, configurations, policies, etc. to each policy group. A segmentation policy may include one or more connectivity policies that are to be assigned to each policy group, as discussed in further detail herein.

In various embodiments, a network area may include any combination of: one or more floors of one or more facilities, one or more subdivisions of one or more floors of a facilities, or the like. In general, a facility may include an office, building, factory, geographic area (e.g., a maintenance yard, etc.), combinations and/or variations thereof, and/or the like.

The method may further include provisioning, at proximity services controller 104, a connectivity policy for each policy group of the plurality of policy groups based on the segmentation policy. In addition to other information as discussed herein, the connectivity policy for each policy group may identify, at least in part, at least one proxy configuration for one or more types of information to be communicated among the devices of each policy group. The method may further include establishing connectivity between each device of each of the plurality of policy groups and at least one access point, such as cellular AP 110, and communicating the one or more types of information to each of the plurality of policy groups based on the at least one proxy configuration for each connectivity policy of each policy group.

Different types of information that may be communicated to/from devices of a policy group may include at least one of: configuration information associated with each of the devices of each policy group; management information associated with each of the devices of each policy group; and telemetry information associated with each of the devices of each policy group. In general, configuration information may include information/data that may be used to configure the operations that are to be performed by a device and/or features thereof (e.g., operations that the device is to perform for manufacturing goods, etc.).

In general, management information may include information/data that may be used to manage the relationships, communications, etc. among devices (e.g., endpoints, as discussed below) of a policy group/D2D network. For example, in some instances one or more security policies may be defined and included in management information that may indicate/identify one or more types of communications/information/data that may be communicated among devices of a given D2D network and/or among other devices of one or more other D2D networks (e.g., communications 150, as illustrated in FIG. 1). In still some instances, security policies may be extended to types of devices and/or applications for which certain exchanges may be performed among device. Other variations can be envisioned. In general, telemetry information may include information/data that may measure, monitor, track, or otherwise relate to operations that may be performed by devices of 3GPP network 130 and may include measurement information, maintenance information, update information, calculations, logs, etc.

Each of the different types of information that may be communicated among devices of a policy group may be associated with a given policy included in the connectivity policy for the policy group. For example, for a given proxy configuration, policy definitions associated with configuration type information may be included in a configuration policy, policy definitions associated with management type information may be included in a management policy, and policy definitions associated with telemetry type information may be included in a telemetry policy. In some embodiments, configuration, management, and telemetry policies may be configured on a per-device basis, on a per-device type basis, on a group basis, combinations and/or variations thereof, and/or the like.

Different variations/options may be provided for a connectivity policy for a given policy group. For example, in some implementations a connectivity policy for a given policy group may be configured with a proxy configuration in which a primary device may be identified to perform proxy operations for one or more types of information to be communicated among devices of the policy group. Consider first policy group 120(1) in which device 122(1.1) may be configured as the proxy device for devices 122(1.2)-122(1.N) for one or more types of information to be communicated among the devices of the policy group. Thus, device 122(1.1) may be considered a 'proxy+endpoint' device such that device 122(1.1) may be an 'endpoint' for information that is meant to be communicated to device 122(1.1).) and may be a proxy for one or more types of information that are to be communicated to other endpoints of the first policy group 120(1), such as devices 122(1.2)-122(1.N). For second policy group 120(2), device 122(2.2) may be configured as the 'proxy+endpoint' device for the policy group whereas devices 122(2.1) and 122(1.M) may be endpoints for the policy group.

In another example, in some implementations a connectivity policy for a given policy group may be configured with a proxy configuration such that a primary device and one or more backup devices may be identified to perform proxy operations for one or more types of information to be communicated among devices of the policy group. Such implementations may be useful for instances in which the primary proxy device is taken offline, breaks down, is removed from the group, etc.

In yet another example, in some implementations a connectivity policy for a given policy group may be configured with a proxy configuration such that no device of the group may be identified to perform proxy operations for any data to be communicated to/from devices of the group. Such implementations may be useful in some circumstances, such as for initial configuration of devices of a factory floor (e.g., Day-1 configurations) when network conditions (e.g., latency of communications between each device and cellular AP 110 and/or between each device, etc.) and/or the amount of data to be communicated among devices may not be fully identified/determined. Following a selection (e.g., manually, automatically, etc.) of a device of a policy group to be the proxy device for the group (e.g., upon identifying/determining network conditions, operations, etc.), the connectivity policy for the group may be updated such that the proxy configuration may identify the selected device to be the proxy device for the group for one or more types of information that are to be communicated to/from devices of the group. Other proxy configuration variations for connectivity policies can be envisioned.

In some implementations, a proxy configuration of a given policy group may be updated to identify, change, remove, or otherwise reconfigure the proxy device(s) of the policy group based on at least one of: one or more network conditions identified for the policy group; one or more changes to one or more devices of the particular policy group; one or more devices being added to the particular policy group; one or more devices being removed from the particular policy group; a change to one or more segmentation policies associated with the particular policy group or one or more other policy groups; combinations and/or variations thereof; and/or the like.

In various embodiments, a segmentation policy and a connectivity policy may be provisioned via group configurator 102 via any combination of operations including, but not limited to: manual provisioning by a network operator/administrator; automatic provisioning based on ingesting one or more policies that may be uploaded/downloaded, queried, or otherwise provided for group configurator 102, and/or learned/updated provisioning via one or more machine learning algorithms; or the like.

Following establishment of connectivity for each policy group of a network area and an access point (e.g., cellular AP 110), different types of information may be communicated to/from devices of each policy group. Conceptual illustrations of "communication paths" that may be facilitated using techniques presented herein are shown in FIG. 1 to illustrate various information that may be communicated to/from devices of each policy group for D2D network establishment and application (information) flow possibilities that may be enabled using techniques provided herein. Bi-directional arrows 160 may be representative of 3GPP proximity services flows for establishing the 3GPP D2D network 124(2) for second policy group 120(2).

Communication paths for any combination of configuration information, management information, and/or telemetry information that are to be communicated to/from a policy group of devices can be structured such that a proxy device for the group may or may not act in a proxy mode for one or more of the communication paths to relay one or more types information to/from other devices of the group. Bi-directional arrows 162 may be representative of flow possibilities for telemetry information that may be communicated to/from devices 122(1.2-1.N) via proxy device 122 (1.1) for first policy group 120(1).

Accordingly, using techniques discussed herein system 100 may provide for creating a trusted point of entry via a proxy device to a D2D network of devices for different purposes such as configuration, management, assurance monitoring, etc. across a 3GPP network for one or more facilities. This eliminates the need for network cabling and allows many different types of facility configurations, reconfigurations, operations, etc. and may be used to meet strict operational requirements for reliability, priority, and/or response times for such networks.

Figure 2A:
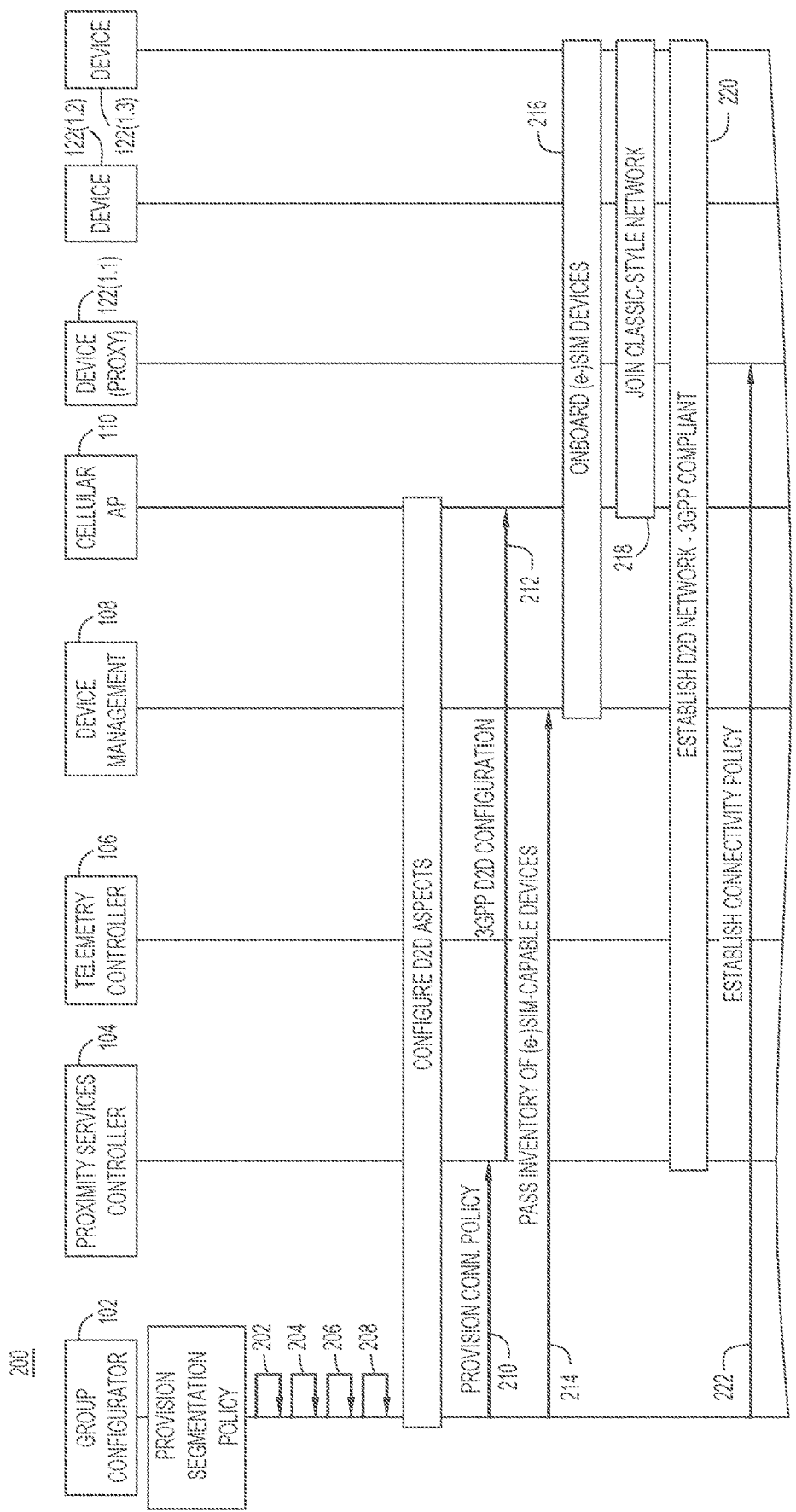
FIGS. 2A, 2B, and 2C are a message sequence diagram illustrating a call flow for providing industrial machine configuration using private wireless networking, according to an example embodiment.
Figure 2B:
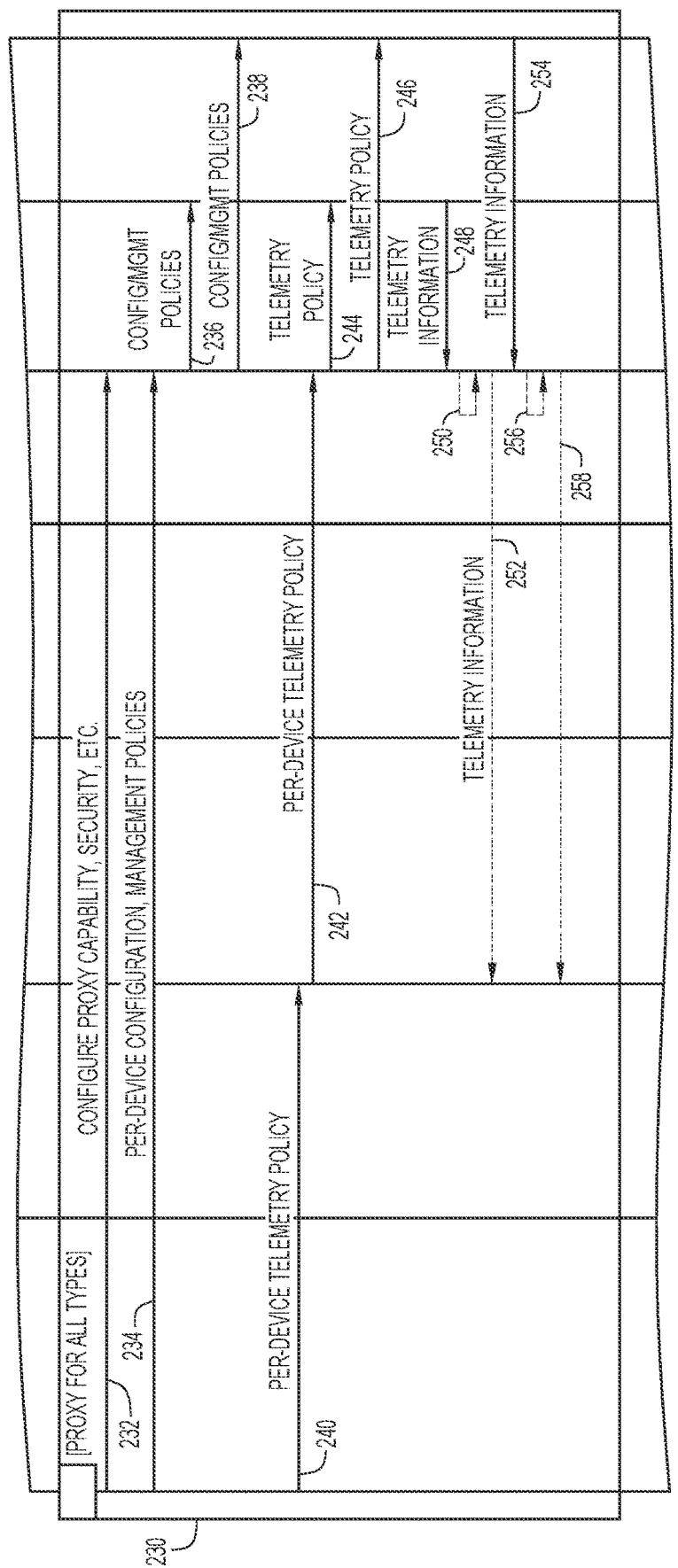
Figure 2C:
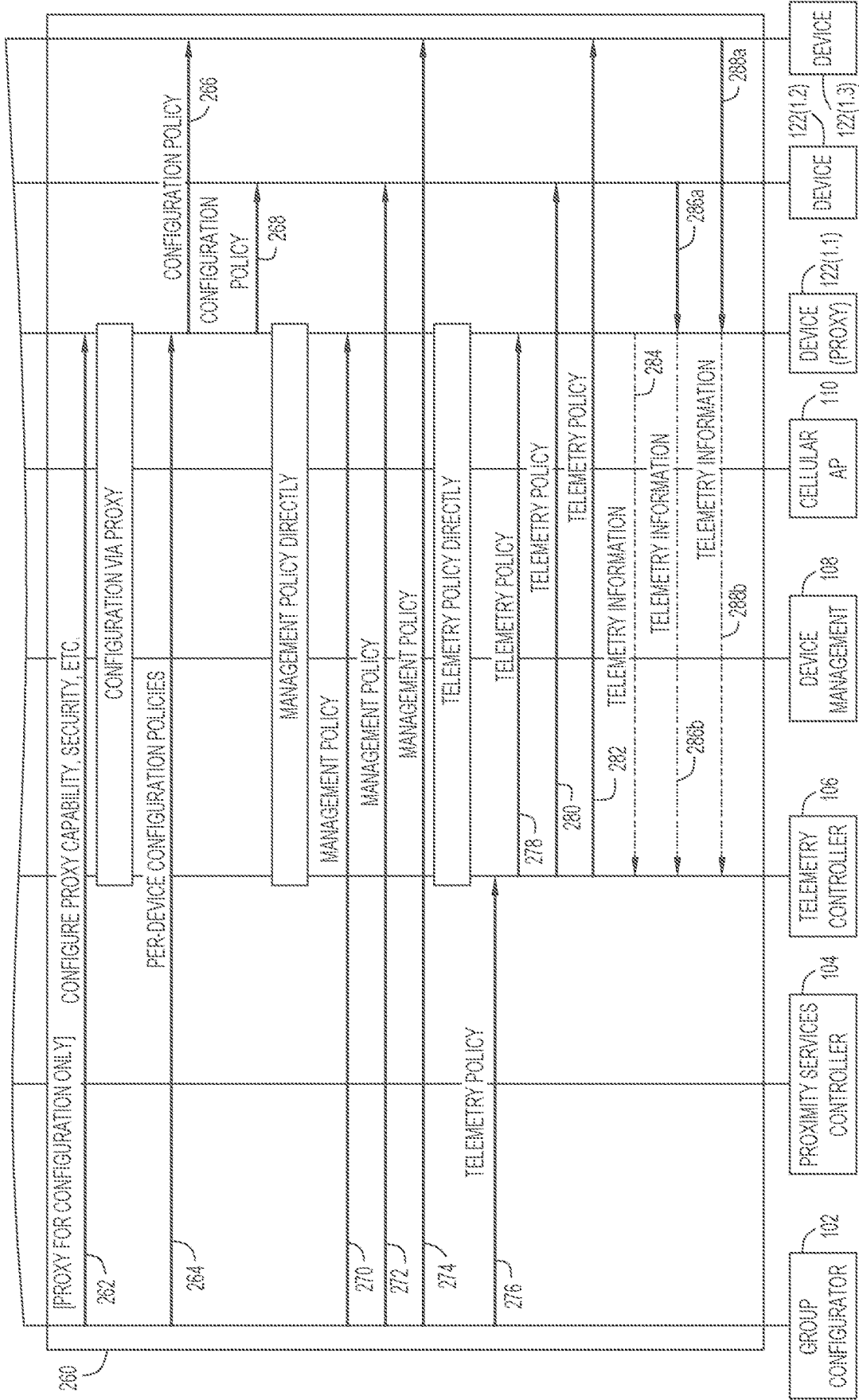

Referring to FIGS. 2A, 2B, and 2C, FIGS. 2A, 2B, and 2C are a message sequence diagram 200 illustrating a call flow for providing industrial machine configuration using private wireless networking, according to an example embodiment. Reference to FIG. 1 may be made with regard to discussions for FIGS. 2A, 2B, and 2C. FIGS. 2A, 2B, and 2C include group configurator 102, proximity services controller 104, telemetry controller 106, device management entity 108, cellular AP 110 and devices 122(1.1), 122(1.2), and 122(1.3) that are part of first policy group 120(1). Device 122(1.1) may be configured to be the proxy device for the first policy group 120(1), as discussed in further detail below.

Consider for FIGS. 2A, 2B, and 2C that an entity, such as a factory, desires to configure devices 122, which may be robots of a floor of the factory or, more generally, a network area of a facility. As illustrated at 202, 204, 206, and 208, a segmentation policy is provisioned at group configurator 102 for the network area. An inventory of devices 122 and cellular APs (e.g., cellular AP 110) may be provisioned by group configurator 102 at 202 to inventory assets (e.g., devices, APs, network equipment, etc.) of the network area. In one example, the provisioning may include creating a list, table, or the like that identifies the devices 122 provided for the factory floor (e.g., using device identifiers (ID), serial numbers, etc.), capabilities and/or limitations thereof, including whether devices are SIM and/or e-SIM capable (labeled herein as '(e-)SIM' to indicate SIM and/or e-SIM capable), and/or any other information that may be relative to provisioning an inventory of the devices.

At 204, provisioning the segmentation policy may include creating policy groups for the network area by segmenting the network area into one or more policy groups including first policy group 120(1) and second policy group 120(2), as shown in FIG. 1. In some instances, the segmentation may be performed in order to group different types of devices, devices that may have different roles/responsibilities, etc. into policy groups. More generally, a network area may be segmented to create one or more policy groups to satisfy any intent that an entity (e.g., factory, enterprise, etc.) may desire for creating, configuring, managing, monitoring, etc. devices of policy groups.

At 206, provisioning the segmentation policy may include creating one or more connectivity policies and assigning the connectivity to the policy groups. For example, a connectivity policy may be created and assigned to first policy group 120(1). In general, a connectivity policy may be a policy that may be assigned to one or more groups of a network area. For example, one connectivity policy may be created for a network area and assigned to multiple policy groups of the area. In another example, different connectivity policies may be created and assigned to different policy groups of a network area. Thus, a connectivity policy may include information, definitions, etc. that may or may not be agnostic to the actual policy group(s) to which the policy is assigned.

In at least one embodiment, a connectivity policy may define: whether D2D communications are allowed for a given policy group; may define device visibility for different types of information for the group (e.g., whether or not devices in the group are directly contacted for configuration, management and/or telemetry and whether or not telemetry can be sourced from the group, can be group managed, and/or can be remotely configured); may include a per-device configuration policy, per-device management policy, and a per-device telemetry policy for the different types of information to be communicated among devices of the policy group; may define 3GPP configuration information such as communications bands/frequencies (e.g., a carrier frequency) or the like as per 3GPP standards to enable 3GPP D2D communications (e.g., if D2D communications are allowed for the policy group); and may identify at least one proxy configuration for the policy group for one or more types of information to be communicated among devices of the policy group.

In at least one embodiment, a proxy configuration may include various information such as whether at least one proxy device (e.g., a primary or a primary and one or more backups) is to be selected/assigned as a proxy for a given policy group, one or more types of information for which at least one proxy device is to act in a proxy mode to relay such information to/from other devices of the policy group, and/or one or more data routing options. In various embodiments, data routing options may identify whether the at least one proxy device is to merely relay one or more types of information among other devices of the policy group, whether the at least one proxy device is to perform one or operations on the one or more types of information in addition to relaying the information among other devices of the policy group, whether the one or more types of information are permitted to leave the policy group, whether the one or more types of information are to leave the policy group in their original format or are to be reformatted, and/or where the one or more types of information are to be routed if it may leave the policy group. In some embodiments, data routing options may additionally or alternatively be included in a policy associated with a given type of information that is to be communicated among devices of a policy group such as, for example, a telemetry policy for the policy group.

As discussed previously, a proxy configuration may or may not identify whether a device is to be selected/assigned as a proxy for a policy group. For instances in which a proxy configuration does not identify that at least one device is to be selected/assigned as a proxy device, the connectivity policy/proxy configuration may still include other information, as noted above, such that when the proxy configuration may be updated to identify that at least one proxy device is to be selected/assigned for the group, other information of the connectivity policy/proxy configuration may or may not also need to be updated.

At 208, provisioning the segmentation policy may include assigning devices and cellular access points to the policy groups. For example, devices 122(1)-122(3) and cellular AP 110 may be assigned to first policy group 120(1). In various embodiments, a proxy device, if identified in the proxy configuration of the connectivity policy for a policy group may be selected or assigned by operator designation, based on device serial number (e.g., a lowest serial number for the group, highest serial number for the group, etc.), using a master election processes carried out among group members, combinations thereof, and/or the like.

Following provisioning of the segmentation policy for the network area, D2D aspects may be configured for the policy groups (e.g., for those policy groups for which D2D communications are allowed), as shown at 210 and 212. At 210, the connectivity policy assigned to first policy group 120(1) is communicated to proximity services controller 104 to provision the connectivity policy for first policy group 120(1) at proximity services controller 104. At 212, proximity services controller 104 performs 3GPP D2D configuration of cellular AP 110. The operations at 212 may be performed in accordance with 3GPP standards to configure cellular AP 110 to configure whether D2D communications are allowed for the first policy group 120(1), group identifying information, communication bands, etc. In some embodiments, this information may be broadcast as system information for the coverage area of the cellular AP 110.

Following provisioning of the segmentation policy via group configurator 102 and provisioning the connectivity policy at proximity services controller 104, devices 122(1)-122(3) may be onboarded and first 3GPP D2D network 124(1) may be established, as shown at 214, 216, 218, and 220. In general, 'onboarding' may refer to operational aspects such as knowing that a device is trusted, knowing device details such as serial numbers and perhaps functional capabilities, and known that a device is available in a pool of devices for 'deployment' or assignment to a given policy group. At 214, group configurator 102 communicates the inventory of (e-)SIM capable devices (e.g., devices 122(1)-122(3)) to device management entity 108, which onboards the (e-)SIM devices at 216 per operations as prescribed by 3GPP standards. At 218, devices 122(1)-122(3) perform classic-style network join operations via cellular AP 110, also as prescribed by 3GPP standards. At 220, first 3GPP D2D network 124(1) is established via proximity services controller 104 as prescribed by 3GPP standards, such as 3GPP TS 23.303, among others. At 222, the connectivity policy assigned to first policy group 120(1) is established for the first policy group 120(1).

As discussed in further detail below, establishing a connectivity policy for a policy group can include any combination of configuring a device as a proxy for the policy group (if a proxy is identified for the proxy configuration of the connectivity policy), communicating one or more of a configuration policy, a management policy, and/or a telemetry policy to a proxy to be relayed to other devices of the policy group (based on the proxy configuration), and/or communicating one or more of a configuration policy, a management policy, and/or a telemetry policy directly to one or more devices of the policy group (based on the proxy configuration).

Two variations for establishing a connectivity policy for first policy group 120(1) are illustrated in FIGS. 2B and 2C. A first variation is shown at 230 in FIG. 2B and a second variation is shown at 260 in FIG. 2C.

For the first variation 230, consider that the connectivity policy for first policy group 120(1) includes a proxy configuration that identifies that a device is to be assigned/selected as the proxy in which device 122(1.1) is selected/assigned as the proxy device for all types of information including configuration information (e.g., configuration policy), management information (e.g., management policy), and telemetry information (e.g., telemetry policy) that is to be communicated among devices 122(1.1)-122(1.3) for first policy group 122(1). For the first variation 230, device 122(1.1) may also be referred to as proxy device 122(1.1).

As shown at 232, group configurator 102 configures proxy capabilities, security policies, and the like for proxy device 122(1.1) based on the proxy configuration/connectivity policy. In at least one embodiment, operations at 232 may include configuration of features to act as a proxy, management monitoring policies to report on the end points using the proxy, and/or rules for establishing a trust relationship between the proxy device and the endpoints that are to use the proxy. At 234, group configurator 102 communicates the per-device configuration and management policies to proxy device 122(1.1). At 236, proxy device 122(1.1) relays the configuration and management policies that are associated with device 122(1.2) to the device. In at least one embodiment, operations at 236 may include identifying the appropriate per-device configuration and management policies to send to device 122(1.2) (e.g., by serial number or other identifying information configured for the policies and the device). At 238, proxy device 122(1.1) relays the configuration and management policies that are associated with device 122(1.3) to the device. In at least one embodiment, operations at 238 may include identifying the appropriate per-device configuration and management policies to send to device 122(1.3).

At 240, group configurator 102 communicates the per-device telemetry policies to telemetry controller 106, which communicates the per-device telemetry policies to proxy device 122(1.1) at 242. Proxy device 122(1.1) relays the telemetry policy associated with device 122(1.2) to the device at 244 and relays the telemetry policy associated with device 122(1.3) to the device at 246.

Consider at 248 that device 122(1.2) communicates telemetry information to proxy device 122(1.1). In some embodiments, depending on the data routing options configured for first policy group 120(1) (e.g., via the proxy configuration and/or telemetry policy), proxy device 122(1.1.) may optionally perform one or more operations on the telemetry information, as shown at 250. Although not shown in FIG. 2B, the telemetry information may be sent to one or more destinations within the entity (e.g., business, factory, etc.) and/or external to the entity (e.g., to device provider network 140). In some embodiments, the information may be sent to telemetry controller 106 at 252 in addition to sending the information to one or more internal and/or external destinations. Similar operations may be performed for telemetry information received by proxy device 122 (1.1.) from device 122(1.3), as shown at 254 and optionally at 256 and/or 258.

For the second variation 260, consider that the connectivity policy for first policy group 120(1) includes a proxy configuration that identifies that a device is to be assigned/selected as the proxy in which device 122(1.1) is identified as the proxy device for only configuration information that is to be communicated among endpoint devices 122(1.2) and 122(1.2) for first policy group 120(1) for only configuration information (e.g., configuration policy) that is to be communicated among devices 122(1.1)-122(1.3) for first policy group 122(1). For the second variation 250, device 122(1.1) may also be referred to as proxy device 122(1.1).

As shown at 262, group configurator 102 configures proxy capabilities, security policies, and the like for proxy device 122(1.1) based on the proxy configuration/connectivity policy. At 264, group configurator 102 communicates the per-device configuration policies to proxy device 122 (1.1). At 266, proxy device 122(1.1) relays the configuration policy that is associated with device 122(1.3) to the device. At 268, proxy device 122(1.1) relays the configuration policy that is associated with device 122(1.2) to the device. As illustrated in FIG. 2C, the order of communications from proxy device to endpoint devices may be varied and need not be provided in a particular order.

At 270, group configurator 102 communicates the management policy that is associated with proxy device 122(1.1) to the device. At 272, group configurator 102 communicates the management policy that is associated with device 122 (1.2) to the device. At 274, group configurator 102 communicates the management policy that is associated with device 122(1.3) to the device.

At 276, group configurator 102 communicates the per-device telemetry policies to telemetry controller 106. At 278, telemetry controller 106 communicates the telemetry policy associated with device 122(1.1) to the device. At 280, telemetry controller 106 communicates the telemetry policy associated with device 122(1.2) to the device. At 282, telemetry controller 106 communicates the telemetry policy associated with device 122(1.3) to the device.

Consider that device 122(1.1) obtains telemetry information and sends it to one or more internal and/or external destinations and/or optionally to telemetry controller 106, as shown at 284. Consider at 286a that device 122(1.2) obtains telemetry information and sends it to one or more internal and/or external destinations and/or optionally to telemetry controller 106, as shown at 286b. Consider at 288a that device 122(1.3) obtains telemetry information and sends it to one or more internal and/or external destinations and/or optionally to telemetry controller 106, as shown at 288b.

Thus, as illustrated in FIGS. 2B and 2C, different techniques may be provided to creating a trusted point of entry via a proxy device to a D2D network of devices for different purposes such as configuration, management, assurance monitoring, etc. across a 3GPP network for one or more facilities.

Figure 3:
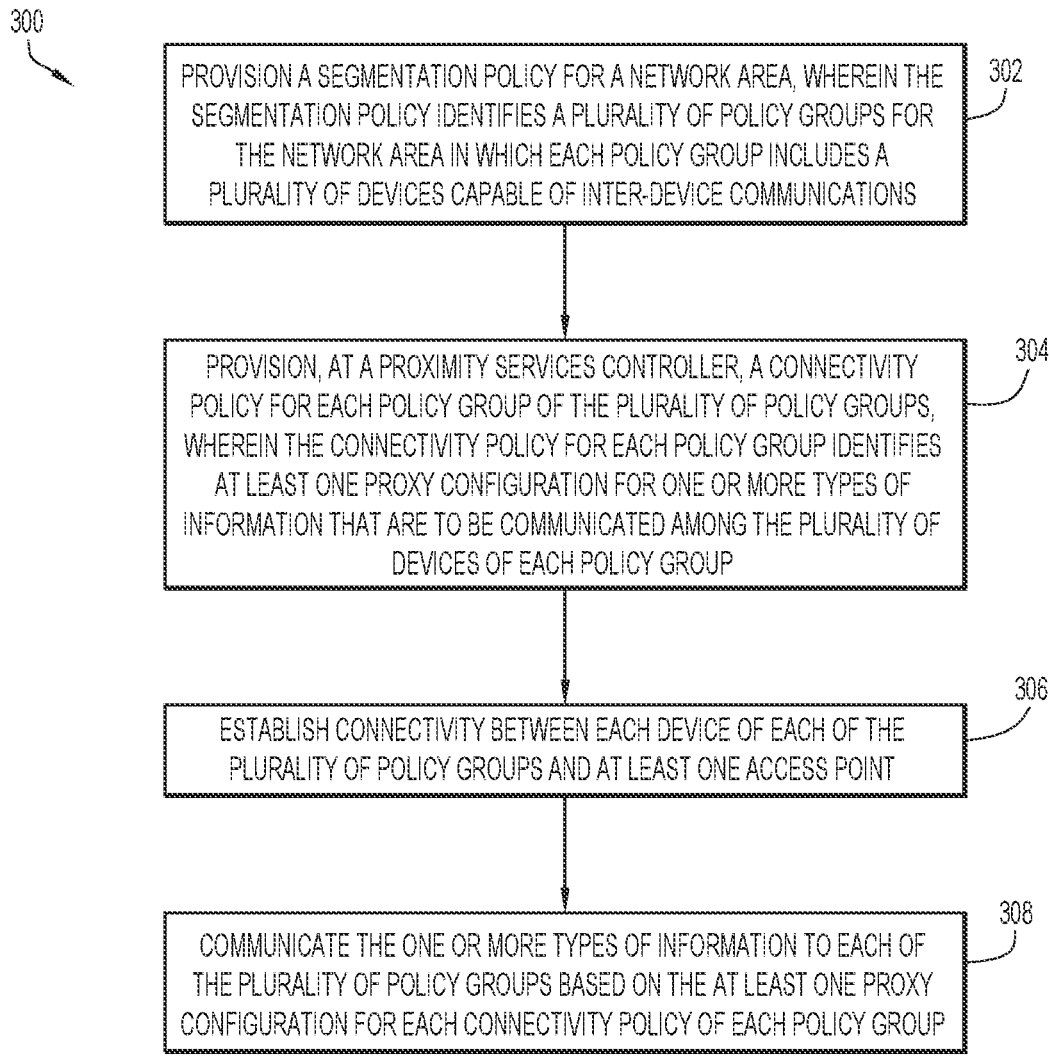
FIG. 3 is a flow chart depicting a method according to an example embodiment.

Referring to FIG. 3, FIG. 3 is a flow chart depicting a method 300 for providing device configuration using private wireless networking, according to an example embodiment. In at least one embodiment, operations associated with method 300 may be performed, at least in part, by a group configurator (e.g., group configurator 102) and a proximity services controller (e.g., proximity services controller 104). Other network elements and/or nodes may also be involved in operations associated with method 300, as discussed for various embodiments described herein.

At 302, the method includes provisioning, via a group configurator (e.g., group configurator 102), a segmentation policy for a network area, wherein the segmentation policy identifies a plurality of policy groups for the network area in which each policy group includes a plurality of devices capable of inter-device communications. At 304, the method may include provisioning, at a proximity services controller (e.g., proximity services controller 104), a connectivity policy for each policy group of the plurality of policy groups, wherein the connectivity policy for each of policy group identifies at least one proxy configuration for one or more types of information that are to be communicated among the plurality of devices of each policy group. At 306, the method may include establishing connectivity between each device of each of the plurality of policy groups and at least one access point (e.g., cellular AP 110). At 308, the method may include communicating the one or more types of information to each of the plurality of policy groups based on the at least one proxy configuration for each connectivity policy of each policy group.

Figure 4:
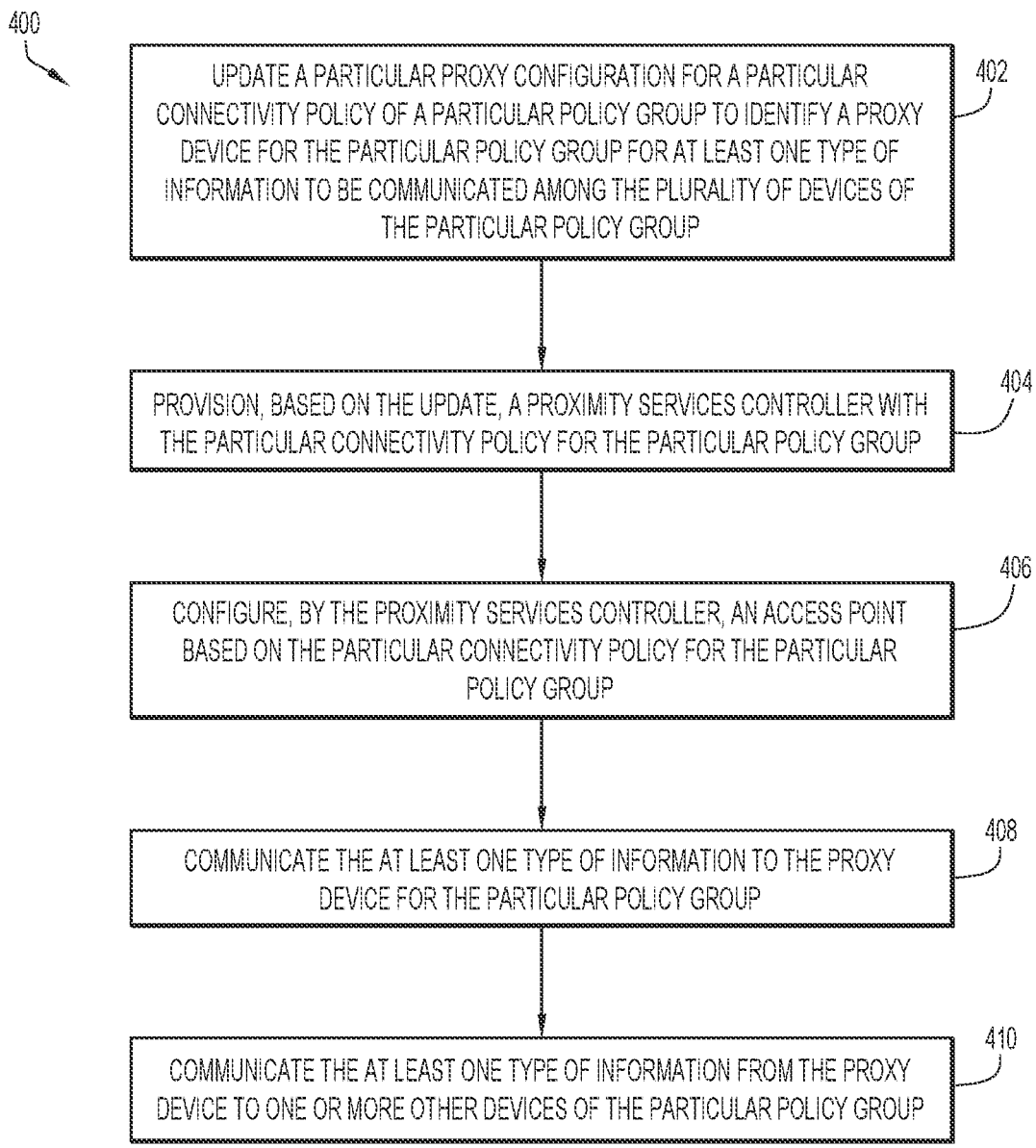
FIG. 4 is another flow chart depicting another method according to an example embodiment.

Referring to FIG. 4, FIG. 4 is a flow chart depicting another method 400 for providing device configuration using private wireless networking, according to an example embodiment. In at least one embodiment, method 400 may be associated with operations that may be performed based on one or more updates that may be provisioned for a connectivity policy having a particular proxy configuration that indicates that no proxy device is configured for any type of information that is to be communicated among devices of a particular policy group. In at least one embodiment, operations associated with method 400 may be performed, at least in part, by a group configurator (e.g., group configurator 102) and a proximity services controller (e.g., proximity services controller 104). Other network elements and/or nodes may also be involved in operations associated with method 400, as discussed for various embodiments described herein.

At 402, the method includes updating a particular proxy configuration for a particular connectivity policy of a particular policy group to identify a proxy device for the particular policy group for at least one type of information to be communicated among the plurality of devices of the particular policy group. In at least one embodiment, the updating may be performed by group configurator 102 based on one or more triggers including, but not limited to: one or more network conditions identified for the particular policy group; one or more changes to one or more devices of the particular policy group; one or more devices being added to the particular policy group; one or more devices being removed from the particular policy group; and a change to one or more segmentation policies associated with the particular policy group or one or more other policy groups At 404, the method includes provisioning, based on the updating, a proximity services controller (e.g., proximity services controller 104) with the particular connectivity policy for the particular policy group. At 406, the method includes configuring, by the proximity services controller, an access point (e.g., cellular AP 110) regarding 3GPP D2D aspects for the policy group. At 408, the method includes communicating the at least one type of information to the proxy device for the particular policy group. For example, the information may be communicated from the proxy configurator or from a telemetry controller (e.g., telemetry controller 106), as discussed for embodiments herein. At 410, the method includes communicating the at least one type of information from the proxy device to one or more other devices of the particular policy group.

In summary, private wireless networks including 3GPP networks, such as 4G/LTE and/or 5G networks that can facilitate communications involving strict latency and/or QoS requirements create the ability to wirelessly connect manufacturing machines in an industrial setting or environment. Using techniques discussed herein, a system (e.g., system 100) and methods may provide for creating a trusted point of entry via a proxy device to a D2D network of devices for different purposes such as configuration, management, assurance monitoring, etc. across a 3GPP network for one or more facilities. This eliminates the need for network cabling and allows many different types of facility configurations, reconfigurations, operations, etc. and may be used to meet strict operational requirements for reliability, priority, and/or response times for such networks.

Referring to FIG. 5, FIG. 5 illustrates a hardware block diagram of a computing device 500 that may perform the functions of any combination of a group configurator (e.g., group configurator 102), a proximity services controller (e.g., proximity services controller 104), a telemetry controller (e.g., telemetry controller 106), a device management entity (e.g., device management entity 108), and/or a cellular AP (e.g., cellular AP 110) referred to herein in connection with FIGS. 1-4. It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer (e.g., hardware) processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which can be inclusive on non-transitory computer readable storage media. In the depicted embodiment, memory 516 may be considered one or more memory element(s) and may include random access memory (RAM) 524 and cache memory 526. In general, memory 516, which may also be referred to as a memory element, can include any suitable volatile or non-volatile computer readable storage media. Instructions for control logic 540 may be stored in memory 516 and/or persistent storage 518 for execution by processor(s) 514. When the processor(s) 514 execute control logic 540 the processor(s) 514 are caused to perform the operations described above in connection with FIGS. 1-4.

One or more programs and/or other logic may be stored in persistent storage 518 for execution by one or more of the respective computer processor(s) 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522, which may be inclusive of one or more network interface cards (NICs), allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

In one form a computer-implemented method is provided and may include provisioning a segmentation policy for a network area, wherein the segmentation policy identifies a plurality of policy groups for the network area in which each policy group comprises a plurality of devices capable of inter-device communications; provisioning, at a proximity services controller for the network area, a connectivity policy for each policy group of the plurality of policy groups, wherein the connectivity policy for each of policy group identifies at least one proxy configuration for one or more types of information to be communicated among the plurality of devices of each policy group; establishing connectivity between each device of each of the plurality of policy groups and at least one access point; and communicating the one or more types of information to each of the plurality of policy groups based on the at least one proxy configuration for each connectivity policy of each policy group.

The one or more types of information may include at least one of: configuration information associated with each of the plurality of devices of each policy group; management information associated with each of the plurality of devices of each policy group; and telemetry information associated with each of the plurality of devices of each policy group. The network area may include at least one of: one or more floors of one or more facilities; and one or more subdivisions of one or more floors of one or more facilities. The one or more facilities may include at least one of: an office; a factory; and a geographical area.

In some implementations, a particular proxy configuration for a particular connectivity policy for a particular policy group can indicate that no proxy device is configured for the particular policy group for any type of information associated with the particular policy group. In such implementations, the access point may be a 3rd Generation Partnership Project (3GPP) access point and the communicating may include communicating the one or more types of information directly to each of the plurality of devices of the particular policy group via the 3GPP access point.

In such implementations, the method may further include: updating the particular proxy configuration for the particular connectivity policy for the particular policy group to identify a proxy device for the particular policy group for at least one type of information to be communicated among the plurality of devices of the particular policy group; provisioning, based on the updating, the proximity services controller with the particular connectivity policy for the particular policy group; configuring the 3GPP access point based on the particular connectivity policy for the particular policy group; communicating the at least one type of information to the proxy device for the particular policy group; and communicating the at least one type of information from the proxy device to one or more other devices of the particular policy group. In such implementations, the updating can be based on at least one of: one or more network conditions identified for the particular policy group; one or more changes to one or more devices of the particular policy group; one or more devices being added to the particular policy group; one or more devices being removed from the particular policy group; and a change to one or more segmentation policies associated with the particular policy group or one or more other policy groups. In such implementations, the particular connectivity policy may further identify whether one or more operations are to be performed at the proxy device for data associated with the at least one type of information received by the proxy device from the one or more other devices of the particular policy group.

In some implementations, a particular proxy configuration for a particular connectivity policy for a particular policy group may identify a proxy device configured for the particular policy group for at least one type of information associated with the particular policy group. In such implementations, the particular connectivity policy may further identifies whether one or more operations are to be performed at the proxy device for data associated with the at least one type of information received by the proxy device from one or more other devices of the particular policy group. In such implementations, the particular proxy configuration for the particular connectivity policy for the particular policy group may further identify a primary proxy device and at least one backup proxy device configured for the particular policy group for the at least one type of information associated with the particular policy group.

In such implementations, the method may further include communicating the connectivity policy from the proximity services controller to the access point; communicating the at least one type of information to the proxy device identified for the particular policy group; and communicating the at least one type of information from the proxy device to one or more other devices of the particular policy group. In such implementations, the connectivity policy may identify whether the plurality of devices for the particular policy group are allowed to communicate with one or more other devices of one or more other policy groups. In such implementations, for one or more other types of information that are not associated with the particular proxy configuration, the method may further include: communicating the one or more other types of information directly to each of the plurality of devices of the particular policy group.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, standalone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    provisioning a segmentation policy for a network area, wherein the segmentation policy identifies a plurality of policy groups for the network area in which each policy group comprises a plurality of devices capable of inter-device communications;
    provisioning, by a group configurator node, a connectivity policy for a proximity services controller for the network area for each policy group of the plurality of policy groups, wherein each connectivity policy for each of policy group identifies at least one proxy configuration for a configuration policy, a management policy, and a telemetry policy that are to be communicated to the plurality of devices of each policy group and identifies whether device-to-device communications are allowed for each policy group, wherein the proximity services controller interfaces with at least one access point;
    establishing connectivity between each device of each of the plurality of policy groups and the at least one access point; and
    communicating the configuration policy, the management policy, and the telemetry policy to each of the plurality of devices of each of the plurality of policy groups based on the at least one proxy configuration for each connectivity policy of each policy group.

2. The method of claim 1, wherein the configuration policy comprises configuration information associated with operations to be performed by each of the plurality of devices of each policy group, the management policy identifies one or more types of information that can be communicated among each of the plurality of devices of each policy group, and the telemetry policy indicates telemetry information that are to be communicated to or from each of the plurality of devices of each policy group.

3. The method of claim 1, wherein the network area comprises at least one of:
    one or more floors of one or more facilities; and
    one or more subdivisions of one or more floors of one or more facilities.

4. The method of claim 3, wherein the one or more facilities comprise at least one of:
    an office;
    a factory; and
    a geographical area.

5. The method of claim 1, wherein a particular proxy configuration for a particular connectivity policy for a particular policy group indicates that no proxy device is configured for the particular policy group for any of a particular configuration policy, a particular management policy, and a particular telemetry policy associated with the particular policy group.

6. The method of claim 5, wherein the access point is a 3rd Generation Partnership Project (3GPP) access point and the communicating further comprises:
    communicating the particular configuration policy, the particular management policy, and the particular telemetry policy directly to each of the plurality of devices of the particular policy group via the 3GPP access point.

7. The method of claim 5, further comprising:
    updating the particular proxy configuration for the particular connectivity policy for the particular policy group to identify a proxy device for the particular policy group for at least one of the particular configuration policy, the particular management policy, and the particular telemetry policy to be communicated to the plurality of devices of the particular policy group;
    provisioning by the group configurator node, based on the updating, the proximity services controller with the particular connectivity policy for the particular policy group;
    configuring the 3GPP access point based on the particular connectivity policy for the particular policy group;
    communicating the at least one of the particular configuration policy, the particular management policy, and the particular telemetry policy to the proxy device for the particular policy group; and
    communicating the at least one of the particular configuration policy, the particular management policy, and the particular telemetry policy from the proxy device to one or more other devices of the particular policy group.

8. The method of claim 7, wherein the updating is based on at least one of:
one or more network conditions identified for the particular policy group;
one or more changes to one or more devices of the particular policy group;
one or more devices being added to the particular policy group;
one or more devices being removed from the particular policy group; and
a change to one or more segmentation policies associated with the particular policy group or one or more other policy groups.

9. The method of claim 8, wherein the particular connectivity policy identifies whether one or more operations are to be performed at the proxy device for data received by the proxy device from the one or more other devices of the particular policy group.

10. The method of claim 1, wherein a particular proxy configuration for a particular connectivity policy for a particular policy group identifies a proxy device configured for the particular policy group for at least one of a particular configuration policy, a particular management policy, and a particular telemetry policy associated with the particular policy group.

11. The method of claim 10, wherein the particular connectivity policy identifies whether one or more operations are to be performed at the proxy device for data received by the proxy device from one or more other devices of the particular policy group.

12. The method of claim 10, wherein the particular proxy configuration for the particular connectivity policy for the particular policy group identifies a primary proxy device and at least one backup proxy device configured for the particular policy group for the at least one of the particular configuration policy, the particular management policy, and the particular telemetry policy associated with the particular policy group.

13. The method of claim 10, further comprising:
communicating the connectivity policy from the proximity services controller to the access point;
communicating the at least one of the particular configuration policy, the particular management policy, and the particular telemetry policy to the proxy device identified for the particular policy group; and
communicating the at least one of the particular configuration policy, the particular management policy, and the particular telemetry policy from the proxy device to one or more other devices of the particular policy group.

14. The method of claim 13, wherein the connectivity policy identifies whether the plurality of devices for the particular policy group are allowed to communicate with one or more other devices of one or more other policy groups.

15. The method of claim 13, wherein for one or more other of the particular configuration policy, the particular management policy, and the particular telemetry policy that are not associated with the particular proxy configuration, the method further comprises:
communicating the one or more other of the particular configuration policy, the particular management policy, and the particular telemetry policy directly to each of the plurality of devices of the particular policy group.

16. One or more non-transitory computer readable storage media encoded with instructions that, when executed by a processor, cause the processor to perform operations, comprising:
provisioning a segmentation policy for a network area, wherein the segmentation policy identifies a plurality of policy groups for the network area in which each policy group comprises a plurality of devices capable of inter-device communications;
provisioning, by a group configurator node, a connectivity policy for a proximity services controller for the network area for each policy group of the plurality of policy groups, wherein each connectivity policy for each of policy group identifies at least one proxy configuration for a configuration policy, a management policy, and a telemetry policy that are to be communicated to the plurality of devices of each policy group and identifies whether device-to-device communications are allowed for each policy group, wherein the proximity services controller interfaces with at least one access point;
establishing connectivity between each device of each of the plurality of policy groups and the at least one access point; and
communicating the configuration policy, the management policy, and the telemetry policy to each of the plurality of devices of each of the plurality of policy groups based on the at least one proxy configuration for each connectivity policy of each policy group.

17. The media of claim 16, wherein the
configuration policy comprises configuration information associated with operations to be performed by each of the plurality of devices of each policy group, the management policy identifies one or more types of information that can be communicated among each of the plurality of devices of each policy group, and the telemetry policy indicates telemetry information that are to be communicated to or from each of the plurality of devices of each policy group.

18. The media of claim 16, wherein a particular proxy configuration for a particular connectivity policy for a particular policy group identifies a proxy device configured for the particular policy group for at least one of a particular configuration policy, a particular management policy, and a particular telemetry policy associated with the particular policy group.

19. A system comprising:
at least one memory element for storing data; and
at least one processor for executing instructions associated with the data, wherein executing the instructions causes the system to perform operations, comprising:
provisioning a segmentation policy for a network area, wherein the segmentation policy identifies a plurality of policy groups for the network area in which each policy group comprises a plurality of devices capable of inter-device communications;
provisioning, by a group configurator node, a connectivity policy for a proximity services controller for the network area for each policy group of the plurality of policy groups, wherein each connectivity policy for each of policy group identifies at least one proxy configuration for a configuration policy, a management policy, and a telemetry policy that are to be communicated to the plurality of devices of each policy group and identifies whether device-to-device communications are allowed for each policy group, wherein the proximity services controller interfaces with at least one access point;

establishing connectivity between each device of each of the plurality of policy groups and the at least one access point; and communicating the configuration policy, the management policy, and the telemetry policy to each of the plurality of devices of each of the plurality of policy groups based on the at least one proxy configuration for each connectivity policy of each policy group.

20. The system of claim 19, wherein the configuration policy comprises configuration information associated with operations to be performed each of the plurality of devices of each policy group, the management policy identifies one or more types of information that can be communicated among each of the plurality of devices of each policy group, and the telemetry policy indicates telemetry information that are to be communicated to or from each of the plurality of devices of each policy group.

* * * * *